Feb. 9, 1971 HANS-JUERGEN RICHTER ET AL 3,562,794

CASSETTE FOR FIXED-VALUE STORES

Filed Sept. 5, 1967 2 Sheets-Sheet 1

INVENTORS
HANS-JUERGEN RICHTER
JOSEF ZEHENTBAUER

BY Stiel, Sherman, Meroni, Gross & Simpson ATTORNEYS

CASSETTE FOR FIXED-VALUE STORES

Filed Sept. 5, 1967 2 Sheets-Sheet 2

INVENTORS
HANS-JUERGEN RICHTER
JOSEF ZEHENTBAUER

BY Stice, Sherman, Mevnie, Crasso & Simpson ATTORNEYS

United States Patent Office 3,562,794

Patented Feb. 9, 1971

3,562,794

CASSETTE FOR FIXED-VALUE STORES

Hans-Juergen Richter, Munich, and Josef Zehentbauer, Munich-Pasing, Germany, assignors to Siemens Aktiengesellschaft, Berlin and Munich, Germany, a corporation of Germany Filed Sept. 5, 1967, Ser. No. 665,613
Claims priority, application Germany, Sept. 13, 1966, S 105,843
Int. Cl. G11c *5/04, 11/06*
U.S. Cl. 340—174 9 Claims

ABSTRACT OF THE DISCLOSURE

A cassette for fixed-value stores, utilizing transformer cores which are controlled by conductor configurations applied to sheet-like carriers, in which such cassette is constructed for the reception of a stack of such sheet-like carriers, which cassette is completely open on one side and on the opposite side at least partially open for facilitating the removal of carriers, therefrom, a plurality of flexible contacts extending into the interior space of the cassette, corresponding in number at least to the number of sheet-like carriers to be received, which contacts are disposed in staggered relation with respect to one another, parallel to the planes of carriers received therein, by approximately the thickness of one sheet plus the thickness of a contact, perpendicularly to the planes of such carriers by approximately the thickness of one sheet, said contacts having such lengths that they will contact the respective conductor configurations applied to sheet-like carriers inserted therein, and in which the sheet-like carriers may be retained in the cassette by gripping means extending inwardly from edges of the casette, and in which a contact pressure device forming a part of the cassette frame may be provided at the contacted end of inserted carriers, which presses such ends against one another and thereby also against the contacts.

The present invention relates to a cassette for fixed-value stores, in which for each permanently stored-in word there is provided a storage plane. Fixed-value stores are being utilized to an increasing extent as program storers, for example, for micro programming, and test program stores in computers, as well as code utilization. A distinction is here made between two types of fixed-value stores, namely those which are electrically settable or changeable and those which are mechanically settable or changeable. The present invention relates to a cassette for the reception of sheet-like carrier members for a fixed-value store whose information content can be varied by mechanical means. Such a mechanically changeable fixed-value store has become known, for example, from the periodical "Proceedings Fall Joint Computer Conference" 1964, page 107 ff. The fixed-value store described in such publication consists primarily of a number of transformer cores, each carrying a reading winding, which cores are linked magnetically with at least one control line, the arrangement of the control line, depending upon the information stored, and either extending through a core or externally conducted past the transformer core. If a current is now sent through the control line, a magnetic field results and thereby a drive signal in only those transformer cores which are magneticaly linked with the control line. The control lines in the known form of construction are applied to sheet-like carriers which in each case are provided with openings for the insertion of the control lines through the transformer cores. Since the stored word is established by the form of the control line, in the changing of a stored word the corresponding sheet-like carrier must be removed from the fixed-value store and replaced by a new carrier in which is stored the desired new word. On page 120 of the above-mentioned publication an arrangement is described which permits the changing of individual storage planes in a stack of such planes. In this arrangement each storage plane of the fixed-value store is provided with a frame which, in a manner not described in detail, is connected with a magazine by means of several prongs serving as contact elements. The storage plane to be changed can then, following removal of the transformer cores, be removed from the magazine by withdrawing the same, and replacing with a new plane. The drawback of this known arrangement lies in the fact that for each storage plane, because of the necessary contacting, a relatively large amount of space is required. Thereby, however, the entire fixed-value storage apparatus becomes large and unwieldly.

It is the problem of the present invention, therefore to produce a fixed-value store having small dimension, and which enables a changing of storage planes in a simple manner. This is achieved by an arrangement in which there is provided for the reception of a stack and sheet-like carriers, a cassette which is completely open at one side and at the other side partially open to facilitate removal of the carriers. In the interior space of the cassette there are disposed a plurality of flexible contacts, corresponding in number to at least the number of sheet-like carriers, which flexible contacts generally extend parallel to the plane of the carriers and are offset or staggered by approximately the thickness of one sheet plus the thickness of a contact, and are offset or staggered perpendicularly to the plane of the carriers by approximately the thickness of one sheet, which contacts have a length such that they contact the conductor configuration applied to the sheet-like carriers inserted in the cassette.

In the drawings, wherein like reference characters indicate like or corresponding parts:

Figure 1:
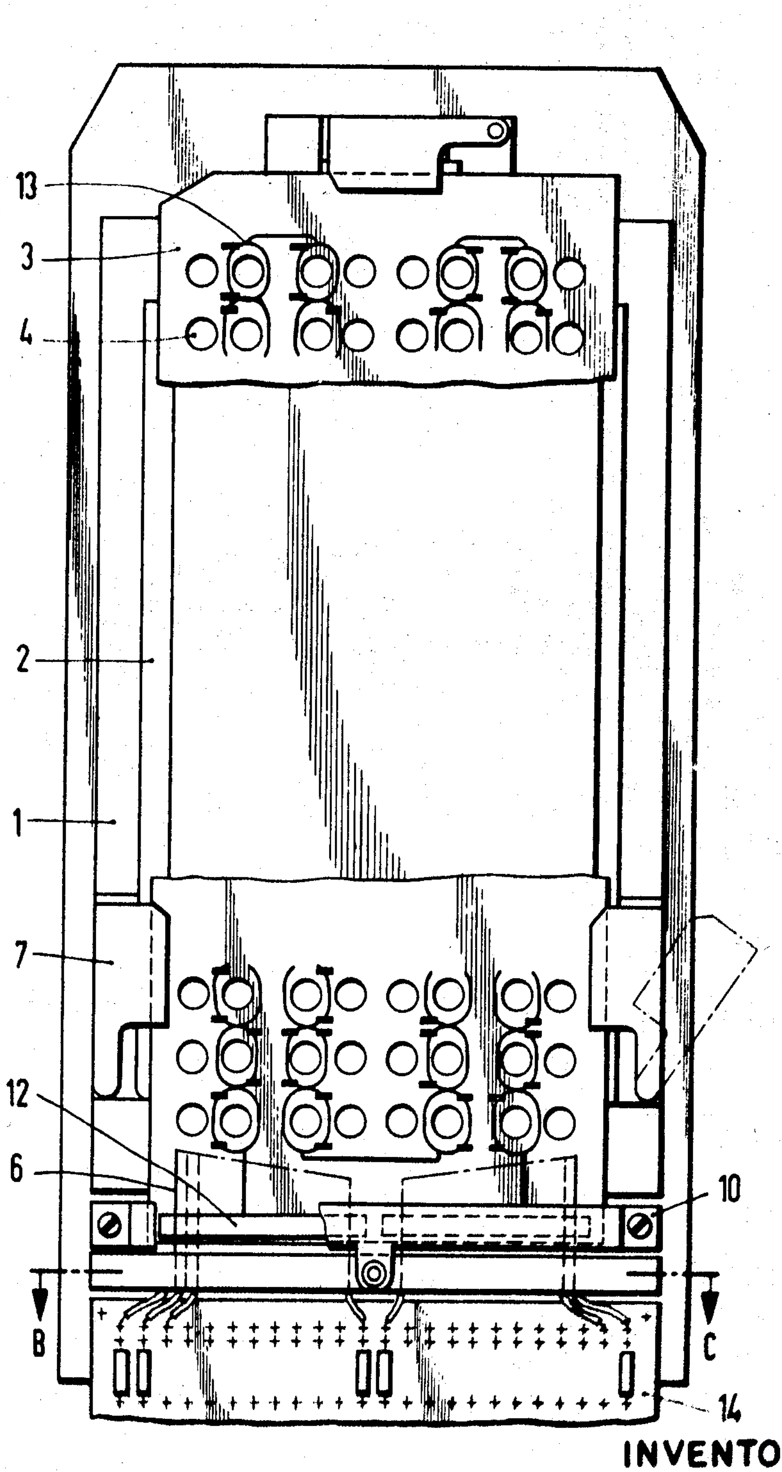
FIG. 1 is a top plan view of a cassette constructed in accordance with the invention.
Figure 2:
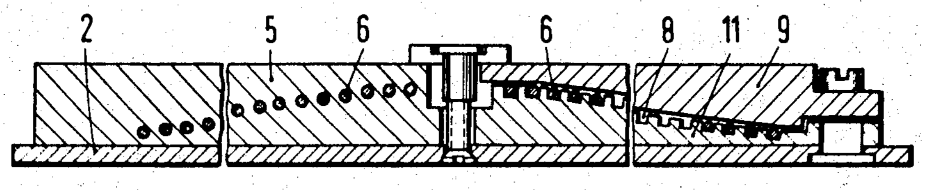
FIG. 2 is a transverse cross-section taken approximately on the line B–C of FIG. 1.
Figure 3:
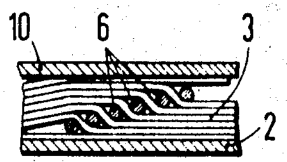
FIG. 3 is a transverse cross-section similar to FIG. 2, taken through the sheet-like carriers and the cooperable contact members.
Figure 4:
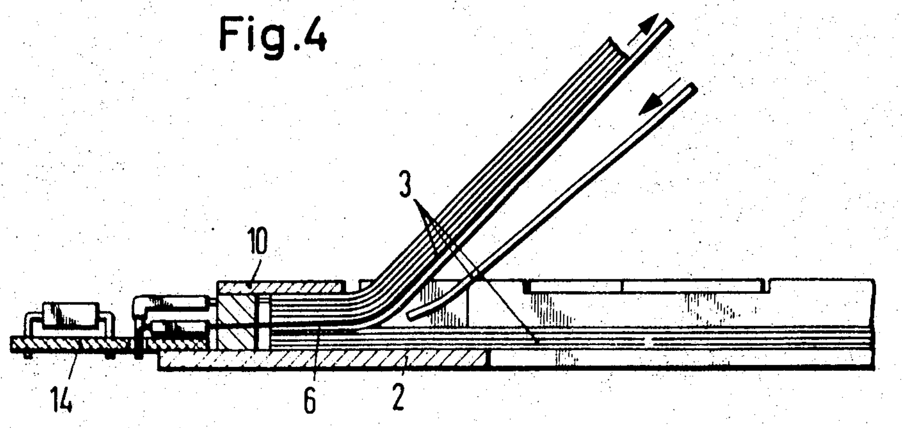
FIG. 4 is longitudinal section illustrating the manner in which the carriers are removed or withdrawn from the cassette.

Referring to FIGS. 1 and 2, the cassette comprises a frame 1 which is closed off on the one side by a bottom 2 (FIG. 2), which, for example, can be provided with openings. Disposed in such cassette, consisting of bottom and frame, are a plurality of carriers 3, each of which have openings 4 therein, through which the magnetic cores to be controlled are inserted. The conductor systems 13 are illustrated in FIG. 1 merely in a simplified and incomplete form. In order to prevent the carriers from falling out, there are arranged on three sides of the cassette frame gripping means in the form of clamps or clips 7 which are swingable outwardly, so that the carriers can be directly inserted in the cassette. When the cassette is filled, the clips 7 are swung inwardly so that they overlie the carriers and cooperate with the cassette frame to retain the carriers in their operative positions. For the control of the conductor system 13 there are provided contact banks, indicated generally by the reference numeral 12. A current can then flow over the contact banks 12, contacts 6 extending through the cassette frame and the conductor system 13. The arrangement of the contacts 6 will be apparent from a reference to FIG. 2. The assembling of the contacts expediently takes place when no carriers are disposed in the cassette. The contacts 6 extending through hte cassette frame 1 are either cemented in receiving bores of a contact carrier 5 as illustrated at the left-hand side of FIG. 2 or disposed in guide grooves 8 arranged on the contact carrier portion 11 (as illustrated at the right-hand side of FIG. 2), so that the contacts 6 are arranged in an exactly defined position. The cores and the grooves 8 are arranged in such a way that they are staggered with respect to one another in elevation, in each case by about the thickness of the carrier, and their lateral offsetting with respect to one another amounts to at least one contact width plus the thickness of an individual carrier. This arrangement of the contacts 6 has the advantage that the number of contacts does not appreciably influence the thickness of the carrier stack, since the carriers are substantially flexible and conform to the contacts 6, so that an approximate disposition there results, similar to that illustrated in FIG. 3. This arrangement of the contacts 6, moreover, also has the advantage that the contacting means on the carriers fit snugly around the contacts 6, so that a faultless contacting is achieved. The contacts 6 lying in the guide grooves 8 are clamped in fixed relation upon the contact carrier 11 by means of a contact pressure member 9. The arrangement, illustrated in FIG. 2 of the guide groove is, in this example of construction, symmetrical to the longitudinal axis of the cassette, but other arrangements are also possible, for example, in such a way that the two contact carriers 5 and 11 rise in the same direction. Exteriorly of the cassette the contacts 6 are connected in a known manner with a contact strip or decoding matrix 14, which, however, is only partially illustrated. For the installation of the carriers in the cassette expediently all the contacts, which may consist of flexible thin wires or tongues, are bent upwardly, whereupon the first carrier body can be inserted. Thereupon the two lowest contacts 6, which in the cross-section according to FIG. 2 are simultaneously the two outer ones, are bent downward, following which the second carrier can be installed. Thereupon the second-lowest contacts are bent downward, following which the insertion of the third carrier may take place, etc. To facilitate the insertion of the carriers, the control contacts 6, extending into the interior of the cassette are staggered or stepped in longitudinal direction as illustrated in FIG. 1. When the cassette is filled, the ends of the carriers extending into the contact banks are then pressed together with the aid of a contact pressure bow or strip 10 (FIGS. 1, 3 4), so that there is achieved a faultless contact between the contact banks 12 and the contacts 6 allocated thereto. To assure the fixed retention of the carriers, the clamps or clips 7 arranged on the cassette frame are swung inwardly, so that the carriers are now completely fixed within the cassette. Consequently, this part of a fixed-value store according to the invention, consisting of cassette and a stack of carriers, can be used in any position without affecting its capability of functioning. The changing of individual carriers is illustrated in FIG. 4, in which a carrier to be changed is removed by the method that the carriers lying above it, including the one to be changed, together with their contacts 6 are bent upward, so that the carrier to be changed, after loosening of the contact pressure bow 10, can be directly removed from the stack and replaced by another information-storing carrier. The contact bow is then retightened, all the carriers are moved back into the cassette and the clips 7 swung inwardly to engage the stack, whereby the cassette is again ready for operation.

Obviously, other forms of construction of the cassette also are possible, especially with regard to the fixing of the carrier bodies and the guiding of the contacts 6. Moreover, the contacts can be suitably insulated at desired places, whereby it is possible to provide additional control lines, which are disposed on the carriers behind the first mentioned control lines, independently of such first mentioned lines. Furthermore, it is possible to so construct the cassette that the electric structural elements required on the carriers for the control of the conductors are accommodated on the cassette itself, for example, in the form of a decoding matrix.

Changes may be made within the scope and spirit of the appended claims which define what is believed to be new and desired to have protected by Letters Patent.

We claim:

1. A cassette for storage planes of a fixed-value storer, which planes comprise flexible sheet-form carriers including conductor paths carried thereon and having holes therein for receiving shanks of transformer cores, said cassette comprising a cassette frame including at least three walls extending therefrom defining an interior space for receiving said carriers, and a plurality of flexible contacts mounted on said frame and extending into said interior space for releasably contacting said conductor paths, said flexible contacts corresponding in number to at least the number of carriers to be received by said cassette and disposed in staggered relation with respect to each other parallel to the planes of carriers to be received by the thickness of one carrier plus the thickness of a contact and disposed in staggered relation perpendicularly to the planes of said carriers by the thickness of a carrier, said flexible contacts having such lengths that they will contact respective conductor paths on respective carriers.

2. A fixed-value store according to claim 1, wherein sheet-like carriers are retained in the cassette by gripping means gripping extending inwardly from at least one edge of the cassette.

3. A fixed-value store according to claim 1, wherein a contact pressure device is provided adjacent the contacted ends of the carriers forming a part of the cassette frame, which device presses such ends of inserted carriers against one another and thereby also against the contacts.

4. A fixed-value store according to claim 1, wherein the contacts comprise wire members whose diameter is equal to the thickness of a carrier.

5. A fixed-value store according to claim 4, wherein the length of the respective contacts are graduated changing in length from the interior space outwardly toward the adjacent edges of the cassette.

6. A fixed-value store according to claim 4, wherein portions of the contacts are provided with insulation.

7. A fixed-value store according to Claim 4, comprising electrical components necessary for the control of the conductor paths arranged on the cassette.

8. A fixed-value store according to claim 1, wherein the contacts are in the form of tongue-like members whose thickness is equal to the thickness of a carrier.

9. A fixed-value store according to claim 8, wherein the length of the respective contacts are graduated changing in length from the interior space outwardly toward the adjacent edges of the cassette.

References Cited

UNITED STATES PATENTS

| | | | |
|---|---|---|---|
| 2,823,360 | 2/1958 | Jones | 340—174X |
| 3,214,743 | 10/1965 | Heidler et al. | 340—174 |
| 3,245,059 | 4/1966 | Eiseman et al. | 340—174 |
| 3,390,384 | 6/1968 | Davis | 340—174 |

STANLEY M. URYNOWICZ, Jr., Primary Examiner